United States Patent [19]

Loesken

[11] Patent Number: 5,410,840
[45] Date of Patent: May 2, 1995

[54] PROCESS FOR PRODUCING A SUPPORT-FREE VEGETATION MAT, PARTICULARLY FOR ROOF GREENING

[75] Inventor: Gilbert Loesken, Uetersen, Germany

[73] Assignee: aktual Bauteile und Unweltschutz Systeme, GmbH & Co. KG, Tornesch, Germany

[21] Appl. No.: 187,394

[22] Filed: Jan. 25, 1994

[30] Foreign Application Priority Data

Jan. 27, 1993 [EP] European Pat. Off. ........... 93101164

[51] Int. Cl.⁶ .............................................. A01G 9/02
[52] U.S. Cl. ................................................ 47/58; 47/73; 47/66; 111/105; 111/901
[58] Field of Search ............... 47/58.25, 66 S, 73 F; 111/199, 901, 902, 105

[56] References Cited

U.S. PATENT DOCUMENTS

| | | | |
|---|---|---|---|
| 3,118,249 | 1/1964 | Bard | 47/66 S |
| 3,159,121 | 12/1964 | Beck | 111/901 |
| 3,232,255 | 2/1966 | Mitchell | 111/901 |
| 4,356,664 | 11/1982 | Rathner | 47/17 MS |
| 4,941,282 | 7/1990 | Milstein | 47/58.25 |

FOREIGN PATENT DOCUMENTS

| | | | |
|---|---|---|---|
| 2492628 | 4/1982 | France | 47/66 S |
| 2602396 | 2/1988 | France | 47/66 S |
| 220820 | 1/1909 | Germany | 47/66 S |
| 2645230 | 10/1976 | Germany . | |
| 3115691 | 11/1982 | Germany | 47/66 S |
| 3805069C2 | 9/1989 | Germany . | |
| 201523 | 9/1987 | Japan | 47/66 S |
| 112723 | 4/1992 | Japan | 47/66 S |
| 92/05690(1) | 10/1991 | WIPO . | |

*Primary Examiner*—Henry E. Raduazo
*Attorney, Agent, or Firm*—Richard S. Roberts

[57] ABSTRACT

The invention relates to a process for producing a support-free vegetation mat which is particularly useful for roof greening. An earth substrate and plants with roots or moss having a stackable, dimensionally stable substrate with raised edges is provided. The vegetation mat is cultivated and transported and on laying the mat is separated from the substrate by sliding or drawing off. Thus, the vegetation mats are not only cultivated, but also transported in a stackable, dimensionally stable substrate with raised edges. Only at the time of laying the vegetation mat is the latter separated from the substrate by sliding or drawing off.

12 Claims, 1 Drawing Sheet

PROCESS FOR PRODUCING A SUPPORT-FREE VEGETATION MAT, PARTICULARLY FOR ROOF GREENING

The invention relates to a process for producing a support-free vegetation mat, particularly for roof greening purposes,

BACKGROUND OF THE INVENTION

The most varied constructional embodiments of such a process are disclosed by the prior art. According to these on a correspondingly .large, previously prepared open air surface, lawns are sown and cultivated in the usual way until a strong sward has formed. The finished law is then mechanically cut up into widths, rolled up and transported to the final place of use. Such roll-type lawns or manually cut turfs are unsatisfactory in a number of respects.

Firstly the manual cutting is imprecise and in the marginal areas leads to faults and non-uniform joints. Secondly damage occurs during transportation and storage as a result of compressive loading and the exclusion of air in the rolled-up state, which causes a significant amount of damage after a few days. Thirdly it is particularly disadvantage that it is not possible in this way to produce, transport and lay in a continuous support-free manner intensively rooting plant types, such as e.g. succulent species (sedum). In fact, they extremely easily break apart. Thus, according to DE-A-1 801 460 a web-like, cut-through plastic support material is required for rolled-up lawns. The recent literature also requires for this purpose the most varied support materials.

In the book "Grundlagen der Dachbegrünung" by Liesecke et al, 1989, in chapter 10"Greening processes and care" under 10.1.4, the prior art of vegetation mats is described.

The guidelines for roof greening of the Forschungdgeselolschaft Landschaftsentwicklung Landschaftsbau (FLL), 1990 edition constitutes the authoritative work in the field of roof greening and represents the up-to-date prior art. It is stated therein under 10.2.7 vegetation mats: "For cultivation, transportation, laying and use purposes, vegetation mats must comprise suitable support inserts . . . "

In the book "Dachbegrünung" by Bernd Krupka in the series Handbuch des Landschaftsbaus, Eugen Ulmer Verlag, 1992, vegetation mats are discussed in section 16.3.

All three of the above publications give a detailed description of vegetation mats. According to these, the prior art characterizes a vegetation mat in that it has a support or carrier insert for cultivation, transportation and laying purposes.

It is also required e.g. in DE-C-38 05 069, that a watering and draining mat for a vegetation element has a support layer of mechanically stabilized polyester needle-punched web, in order to counteract a serious wetting risk.

All the known vegetation mats have straw, coconut and nonwoven matting as the support, said mats being rottable, whereas so-called claw fabric mats fulfilling the same function are resistant to rotting and tension-proof. The main function of the rottable support inserts is to render said vegetation mats transportable, so that after cultivation they can be rolled up, loaded onto Euro-pallets and e.g. laid by simply rolling out in extreme positions such as roofs, as well as on salt, coal or refuse heaps. Whereas the rottable support inserts lose their function after rotting, the claw fabric mats have to retain certain functions. The conventional vegetation mats provided with supports are disadvantageous in several respects. Thus, they are cultivated or grown on a plastic sheet or the like, which becomes unusable after it has been used for one or two growing processes and must be disposed of at high cost. Due to the contamination of the plastic sheet recycling is not at present possible. In order that they have a sufficiently high strength for one to two years, the rottable support layers must have a non-rottable plastic fraction of up to 30% in the form of plastic fibres or fabrics. In the case of so-called nonwoven mats there are wind and water erosion problems during cultivation, particularly at the edges, because the vegetation mat substrate is merely placed on the nonwoven and not, as is the case with claw fabric mats, intermeshed with the support. If nonwoven mats are e.g. laid on the roof, but the transportation has led to the dropping out of vegetation parts or substrate which have not been repaired, in these areas there is an increased susceptibility to wind and water erosion. At these points the nonwoven is exposed. Thus, so-called "bald patches" are formed, which are virtually non-colonized by vegetation and a closing of the vegetation is only possible as a result of significant effort and expenditure.

SUMMARY OF THE INVENTION

The problem of the invention is to improve the aforementioned processes in such a way that a longer storage and transportation stability is ensured, whilst permitting a faster, cleaner "harvest", with respect to the marginal areas. A further aim of the invention is to avoid the aforementioned disadvantages of vegetation mats using support inserts and the like, whilst also permitting the use of a high proportion of succulent plant types, such as sedum. A further aim of the invention is to be able to work independently of weather influences during the cultivation, growing and transportation. It is also very clear that the sought procedure must be inexpensive and environmentally friendly.

DETAILED DESCRIPTION OF THE PREFERRED EMBODIMENT

Figure 1:
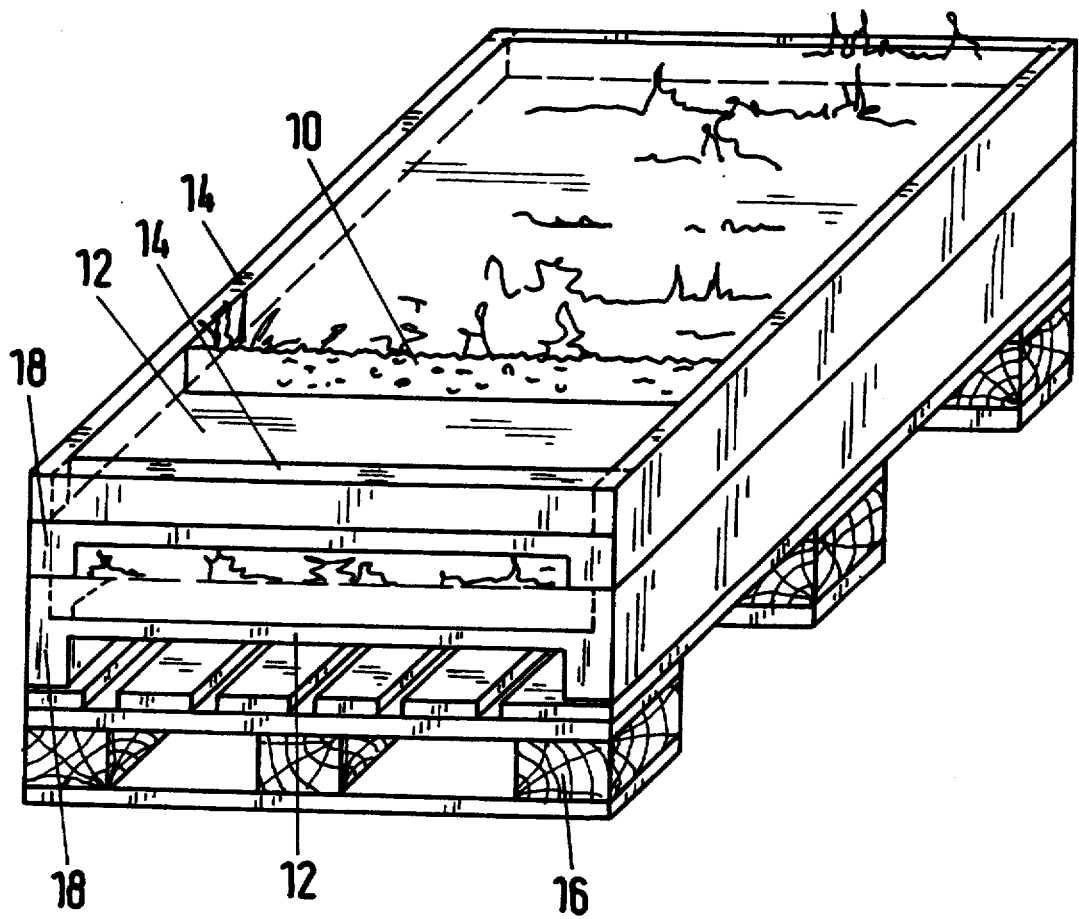
FIG. 1 shows a perspective view of two stacked units.

This problem and the further aims are solved by the process of this invention. Thus, the vegetation mats are not only cultivated, but also transported in a stackable, dimensionally stable substrate with raised edges. Only at the time of laying the vegetation mat is the latter separated from the substrate by sliding or drawing off. The latter can advantageously be achieved by a certain inclination of the substrate, so that the vegetation mat slides from it by the force of gravity and reaches the final greening location, where it is ultimately intended to grow. The raised edges of the substrate are necessary during growing for watering and producing strong-edged vegetation mats. They can rise continuously from the ground in the manner of a baking tin. The substrate can also advantageously be formed by a rectangular, box-like container with spacers or feet, one side of the raised edges being removed during the separation of the vegetation mat oaf are pivoted out of the way. The height of the raised edges is also not critical, but is chosen in accordance with the desired vegetation mat thickness or is somewhat greater, being more particularly 2 to 8 cm. With respect to the surface of the bottom of the substrate the raised edges must be looked upon as shallow. The shape, size and material of the substrate used according to the invention is not critical and can instead be chosen from within a wide range. However, particular consideration is given to a plastic substrate of 80×120 cm. To this extent the vegetation mat portion can have the dimensions of a Euro-pallet or can be chosen correspondingly smaller, which in turn facilitates transportation. The cultivation and transportation of support-free vegetation mats in the stackable, dimensionally stable substrates leads to numerous different advantages. Thus, considerable production costs are saved, because neither sheets, nor support nonwovens are required and there is no need to dispose of these, the substrate being constantly reusable. Therefore the vegetation mat produced according to the invention is particularly friendly to the environment through obviating the use of such plastics. There is also no need for the intense rooting required with rolled-up lawns.

The vegetation mats produced according to the invention do not have to be rolled up or stacked with special retaining devices on Euro-pallets, because the transportation and/or storage advantageously takes place by means of superimposed substrates. Thus, there is no rolling up in the open and palletization takes place directly on the pallet fork of the tractor, which constitutes a significant labour saving. The vegetation mats produced according to the invention, as opposed to the rolled-up vegetation mats, are not exposed to any damage, such as occurs through the rolling up and the air exclusion in the rolled-up state. As a result of the stacking of the substrates used according to the invention, during transportation and storage the vegetation mats are not exposed to any compressive loading and are constantly ventilated in the vegetation area, so that the thus stacked and transported vegetation mats can be stacked in superimposed form for up to roughly two weeks.

The raised edges of the substrate are also used to avoid marginal erosion during cultivation and transportation.

Due to the advantageous provision of spacers or feet during cultivation the vegetation mat supports are spaced from the ground. In this way the ground is not sealed and the precipitated water can seep away without any problem below the vegetation mat support.

As there is no ground connection, foreign growth which, as hitherto, has occurred in the tracks between the vegetation mats, cannot grow into the latter. Thus, there is no need to use herbicide or eliminate said foreign vegetation by cutting.

Hereinafter the growth of various exemplified vegetation mats 10 is described in order to provide a better understanding of the invention.

Onto the plastic, wooden or metal substrate 12 with a plate-like bottom, which has a smooth surface and for stiffening purposes is e.g. provided with ribs on the underside, are applied a substrate corresponding to the intended use and the vegetation composition, plant parts (seedlings) of plants e.g. succulents and moss suitable for the intended function of the vegetation mats 10 and seed of suitable plants and grasses.

As a function of the sought vegetation there are various vegetation mat types, which can be roughly subdivided in the following way:

1. Sedum/moss vegetation mats 10.

These mats are characterized in that they mainly consist of sedum. The mats contain a certain amount of moss, e.g. as a result of spontaneously growing moss spores or by the scattering of mass fractions.

2. Sedum/plant/grass vegetation mats 10.

The sedum still represents approximately 50 to 60% of the projective vegetation covering. The grasses and plants increase the strength of the vegetation mat 10. Moss vegetation is possible and desirable in limited proportions. As a function of the future position for the mat, the sowing of grass and plants either takes place directly with the seeding and scattering of the sedum seedlings or e,g. in the case of substrate layer thicknesses on the roof of below 6 cm a few weeks prior to delivery.

3. Grass/plant vegetation mats 10 with sedum fractions.

These vegetation mats are suitable for vegetation layer thicknesses as from 5 cm, the sedum fraction of these mats being at least 30%.

A desired number of substrates 10 is laid in press-planted manner, so that during the cultivation time it can be walked or driven on e.g. for care purposes.

Through the joints of the substrates 12 and in conjunction with their feet or spacers 18 and the air gap formed by then between the substrate 12 and the grown ground excess precipitated or rain water enters the soil. This prevents temporary wetting and a possible floating of the vegetation mats 10 or water erosion is prevented.

The plants which are very sensitive to dryness, sun and wind action in the germination and seedling stage are completely covered with a "shading fabric" immediately after laying in the open. As a function of the vegetation development and the time of year, this shading fabric is left on the crop for a few weeks or months.

In dry weather and adapting to the water needs of the crop, watering takes place at shorter intervals and in, smaller amounts than for crops on grown ground, because the relatively thin substrate layer is only able to retain less water. The above-described shading fabric reduces the water evaporation caused by sunshine and wind.

As a result of a harmonic supply of water and nutrients vegetation development is brought about. A planned variation of these factors, after the desired vegetation development has taken place, leads to stress situations, which bring about an optimization of the vitality of the plants for future extreme locations.

The process according to the invention can naturally also be performed with improved growth in the greenhouse with controlled watering and temperature.

During harvesting, respectively loading the fully developed vegetation mats 10, the substrates 12 with the vegetation cultivated therein are manually stacked on the pallet forks of a loading vehicle. By a corresponding formation of the substrate 12 with raised edges 14 and feet or spacers 18 they are stackable and transportable with the finished vegetation, as is shown in FIG. 1 by means of two substrates 12 stacked on a Euro-pallet 16, without damaging the vegetation by pressure, rolling, light or air deficiencies, etc. Unlike in the case of vegetation mats delivered in rolled form, due to the air and light access within the; stack, the present mats can be transported and intermediately stored for a much longer time.

For laying the vegetation mats 10, the latter and their substrate 12 are transported e.g. onto a roof. By inclining the plate-like substrate the support-free vegetation mat 10, ran slide onto the intended surface. With laying of this, type, any cracks which occur do not create a problem, because the vegetation is rooted in lift-resistant manner within a few days, so that there is no need to rework marginal areas, because the vegetation mats 10 are laid in press-planted manner.

I claim:

1. A method of producing a vegetation mat which is free of support comprising the steps of providing a plurality of substrate units, each having first raised edges which are stackable and an additional edge, growing a vegetation mat segment on each of said plurality of substrate units, stacking said substrate units, transporting said units to a use location and sliding said vegetation mat segment from said units via said additional edge to form said vegetation mat.

2. The method of claim 1 wherein the vegetation mat segments comprise sedum.

3. The method of claim 1 comprising the step of growing the vegetation mat segment while the substrate units are spaced from the ground.

4. The method of claim 1 comprising the step of reusing the substrate unit a plurality of times.

5. The method of claim 1 comprising the step of providing each of the substrate units with soil, seed and plant parts or moss.

6. The method of claim 1 comprising the step of growing the vegetation mat segments in a greenhouse, a vegetation building or in the open.

7. The method of claim 1 comprising the step of storing several substrates units in juxtaposed form prior to transporting.

8. The method of claim 1 comprising the step of transporting or a storing the substrate units while the substrate units are stacked.

9. The method of claim 1 comprising the step of inclining the substrate unit thereby allowing the vegetation mat segment to slide from said substrate unit to its use location.

10. The method of claim 1 comprising the step of forming the height of the raised edge about equal to or larger than the vegetation mat thickness.

11. The method of claim 1 comprising the step of growing the vegetation mat segment with rooting plants, to an approximately complete coverage.

12. The method of claim 1 wherein water is passed into the soil through joints of the substrate units, and an air space is provided by means of spacers between the substrate units and the ground.

* * * * *